(12) United States Patent
Hartlaub (10) Patent No.: US 9,227,540 B2
(45) Date of Patent: Jan. 5, 2016

(54) HEIGHT- AND/OR INCLINATION-ADJUSTABLE HEAD RESTRAINT FOR A VEHICLE SEAT

(75) Inventor: Silvio Hartlaub, Pulheim (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/343,041

(22) PCT Filed: Jul. 11, 2012

(86) PCT No.: PCT/EP2012/063538
§ 371 (c)(1),
(2), (4) Date: Apr. 22, 2014

(87) PCT Pub. No.: WO2013/034337
PCT Pub. Date: Mar. 14, 2013

(65) Prior Publication Data
US 2014/0284985 A1    Sep. 25, 2014

(30) Foreign Application Priority Data
Sep. 9, 2011   (DE) .......................... 10 2011 112 769

(51) Int. Cl.
*B60N 2/48* (2006.01)
*B60N 2/225* (2006.01)
*B60N 2/235* (2006.01)

(52) U.S. Cl.
CPC ............ *B60N 2/4841* (2013.01); *B60N 2/2252* (2013.01); *B60N 2/2356* (2013.01); *B60N 2/4844* (2013.01); *B60N 2/4847* (2013.01)

(58) Field of Classification Search
CPC .. B60N 2/2252; B60N 2/4847; B60N 2/4844; B60N 2/2356; B60N 2/2213; B60N 2/4841; B60N 2/4805
See application file for complete search history.

(56) References Cited

U.S. PATENT DOCUMENTS 4,674,792 A  *  6/1987  Tamura et al. ................. 297/408
4,678,232 A  *  7/1987  Ishida et al. ................... 297/408
(Continued)

FOREIGN PATENT DOCUMENTS

| CN | 101633333 A | 1/2010 |
|---|---|---|
| DE | 25 25 013 A1 | 12/1976 |

(Continued)

OTHER PUBLICATIONS

International Search Report issued in related International Patent Application No. PCT/EP2012/063538, completed Mar. 6, 2013.

(Continued)

*Primary Examiner* — Joshua J Michener
*Assistant Examiner* — Matthew Gitlin
(74) *Attorney, Agent, or Firm* — Foley & Lardner LLP (57) ABSTRACT

A height- and/or inclination-adjustable head restraint for a vehicle seat includes at least one holding element, a head restraint cushion, a head restraint structure and an inclination-adjustment mechanism that includes at least one latching plate, a toothed profile and an actuating element. The latching plate is arranged on the holding element and, in a locked state of the inclination-adjustment mechanism, engages in a form-fitting and/or frictional manner in the toothed profile, which is arranged on the head restraint structure. The lower end of the head restraint structure is coupled pivotably to the holding element and, upon pivoting of the head restraint about the holding element; in a non-locked state of the inclination-adjustment mechanism, the form-fitting and/or frictional connection between the latching plate and the toothed profile is released and a relative movement is thereby brought about between the latching plate and the toothed profile.

15 Claims, 6 Drawing Sheets

(56) References Cited

U.S. PATENT DOCUMENTS

| | | | |
|---|---|---|---|
| 5,238,295 A * | 8/1993 | Harrell | 297/408 |
| 6,000,760 A * | 12/1999 | Chung | 297/408 |
| 6,045,181 A * | 4/2000 | Ikeda et al. | 297/216.12 |
| 6,511,130 B2 * | 1/2003 | Dinkel et al. | 297/410 |
| 8,083,291 B2 * | 12/2011 | Yoshida | 297/408 |
| 8,303,038 B2 * | 11/2012 | Smith | 297/408 |
| 8,641,149 B2 * | 2/2014 | Little | 297/408 |
| 2007/0164593 A1 | 7/2007 | Brockman | |
| 2010/0019559 A1 | 1/2010 | Smith | |

FOREIGN PATENT DOCUMENTS

| | | |
|---|---|---|
| DE | 10 2009 036896 B3 | 9/2010 |
| EP | 0 175 959 A2 | 4/1986 |
| FR | 2 564 045 | 11/1985 |
| JP | 59-186746 | 10/1984 |
| JP | 2011-084159 A | 4/2011 |

OTHER PUBLICATIONS

Office Action dated Jun. 3, 2015 received in corresponding Chinese application No. 201280043266.3, 8 pages.

Office Action dated May 19, 2015, received in corresponding Japanese Application No. 2014-528909, 4 pages.

Second Office Action dated Mar. 16, 2015, in corresponding Korean Application No. 10-2014-7009450 and English translation, 5 pages.

* cited by examiner

HEIGHT- AND/OR INCLINATION-ADJUSTABLE HEAD RESTRAINT FOR A VEHICLE SEAT

The present application is a U.S. National Phase of International Patent Application No. PCT/EP2012/063538, filed Jul. 11, 2012, which claims priority from German Patent Application No. 10 2011 112 769.4, filed Sep. 9, 2011. The contents of these applications are incorporated herein by reference in their entirety.

The invention relates to a height- and/or inclination-adjustable head restraint for a vehicle seat as claimed in the preamble of claim 1.

Many different inclination-adjustment mechanisms for head restraints of vehicle seats are known in the prior art.

U.S. Pat. No. 6,000,760 discloses an inclination-adjustment mechanism for a head restraint of a vehicle seat.

DE 11 2004 000 602 T5 discloses a device for the rearward and forward movement of a head restraint.

It is the object of the present invention to specify a height- and/or inclination-adjustable head restraint for a vehicle seat which is improved relative to the prior art.

With regard to the height- and/or inclination-adjustable head restraint for a vehicle seat, the object is achieved by the features specified in claim 1.

Advantageous developments of the invention form the subject-matter of the sub-claims.

The height- and/or inclination-adjustable head restraint for a vehicle seat comprises at least one holding element, a head restraint cushion, a head restraint structure and an inclination-adjustment mechanism which comprises at least one latching plate, a toothed profile and an actuating element, wherein the latching plate is arranged on the holding element and in a locked state of the inclination-adjustment mechanism engages positively and/or non-positively in the toothed profile which is arranged on the head restraint structure and wherein the head restraint structure at its lower end is coupled pivotably to the holding element and, upon pivoting the head restraint about the holding element in a non-locked state of the inclination-adjustment mechanism, the positive and/or non-positive connection between the latching plate and the toothed profile is released such that a relative movement is brought about between the latching plate and the toothed profile or comprising at least one holding element, a head restraint cushion, a head restraint structure and an inclination-adjustment mechanism which comprises at least one latching plate and a toothed profile, wherein the latching plate is arranged on the holding element and wherein the toothed profile is shaped in the manner of a barb and such that a relative movement is permitted between the latching plate and the toothed profile in the direction of travel in the locked state of the inclination-adjustment mechanism and wherein, in a non-locked state of the inclination-adjustment mechanism, a relative movement between the latching plate and the toothed profile counter to the direction of travel is permitted. As a result, a particularly simple and compactly constructed inclination-adjustment mechanism for a head restraint of a vehicle seat is possible with a minimal number of moving components, said head restraint being able to be produced in a simple and cost-effective manner.

By means of this compact construction, the inclination-adjustment mechanism is arranged entirely within the head restraint and surrounded on all sides by the head restraint cushion so that sharp edges and/or hard portions of the inclination-adjustment mechanism are covered and a risk of injury to the vehicle occupants is reduced.

In a first variant, the toothed profile is able to be moved in a linear or pivotable manner away from the latching plate for the reversible release of the positive and/or non-positive connection between the latching plate and the toothed profile.

In a second variant, the latching plate is displaceably arranged on the holding element so that, by means of the displacement movement, the positive and/or non-positive connection is able to be released between the latching plate and the toothed profile.

In this case, the latching plate is able to be arranged on the holding element so as to be displaceable in the direction of the seat backrest or in the horizontal direction.

In this manner, an activation of the inclination-adjustment mechanism may be adapted in a variable manner to the respective construction of the head restraint, in particular to the spatial conditions in the interior.

The holding element is of substantially U-shaped configuration and comprises two arms and a horizontally arranged portion, wherein one respective shoulder is arranged in the respective coupling region between the arms and the portion, said shoulder in each case comprising a further horizontally arranged portion.

Moreover, at a lower end of the holding element, the arms are configured as guide pins which are displaceably arranged at least partially in corresponding recesses in a backrest of the vehicle seat, so that a height adjustment of the head restraint is possible relative to the vehicle seat.

Moreover, the head restraint is configured to be pivotable about a shaft which is formed from the horizontally arranged portions of the U-shaped holding element.

Thus in a simple manner, a plurality of functions are integrated in one component. The horizontally arranged portions of the holding element form the shaft for the inclination-adjustment of the head restraint and the vertical portions form the height-adjustment of the head restraint.

Preferably, the toothed profile is formed from a predeterminable number of teeth, latching elements or latching lugs arranged in succession in rows. In this case, the number of teeth, latching elements or latching lugs determines a number of adjustment positions of the inclination-adjustment mechanism.

The actuating element and an activating element of the latching plate cooperate mechanically, wherein the activating element is configured to correspond at least partially with the actuating element. The actuating element and activating element, for example, cooperate mechanically, for example by means of two correspondingly shaped oblique portions. Actuating the actuating element by applying a lateral compressive force results in a lateral movement of the actuating element in the horizontal direction. The shaped oblique portions permit a deflection of the horizontal movement of the actuating element into a linear vertical movement of the latching plate in the direction of the backrest and a resulting release of the positive and/or non-positive connection between the latching plate and the toothed profile.

Exemplary embodiments of the invention are described in more detail hereinafter with reference to the drawings, in which.

Parts which correspond to one another are provided in all the drawings with the same reference numerals.

Figure 1:
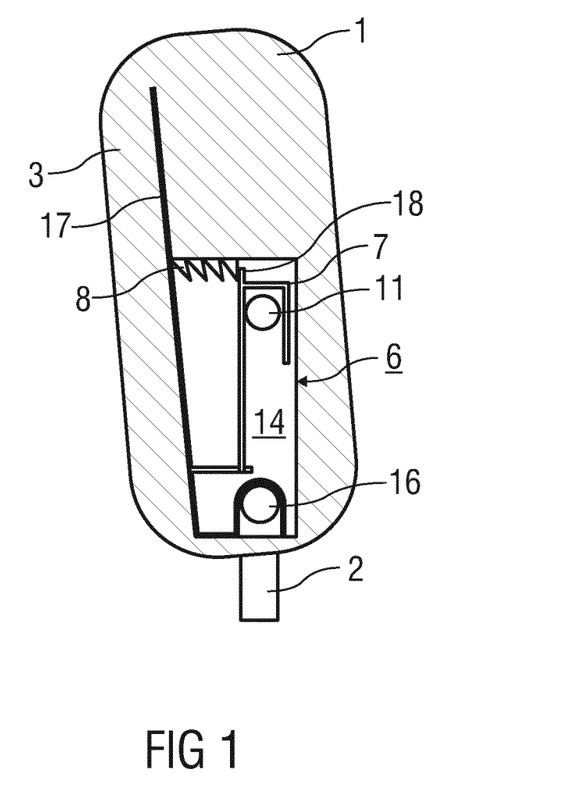
FIG. 1 shows schematically a side view of a head restraint in a position fully inclined to the front.

In FIG. 1, a side view of a head restraint 1 is shown schematically in a position fully inclined to the front, i.e. arranged in a front end position.

Figure 2:
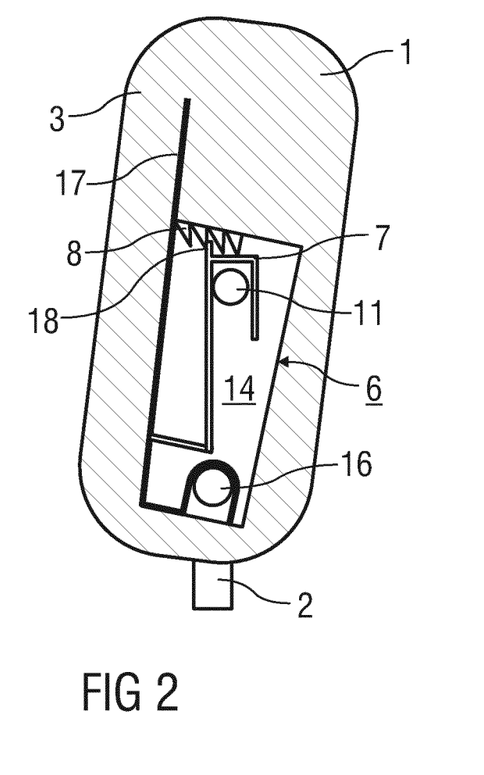
FIG. 2 shows schematically a side view of a head restraint in a position fully inclined to the rear.

In FIG. 2, a side view of a head restraint 1 is shown schematically in a position fully inclined to the rear, i.e. arranged in a rear end position.

The head restraint 1 is preferably arranged by means of a holding element 2 on the upper end of a backrest, not shown, of a vehicle seat. In this case, the head restraint 1 comprises a head restraint structure 17 and at least one head restraint cushion 3 which is arranged on the head restraint structure 17, facing at least in the direction of the seat occupant. In a preferred embodiment, the head restraint structure 17 is surrounded on all sides by the head restraint cushion 3, so that the head restraint 1 is upholstered on all sides.

The holding element 2 is preferably of U-shaped configuration and comprises two arms 10 and a horizontally arranged portion 11. One respective shoulder 12 is arranged in the coupling region between the arms 10 and the portion 11. In this case, each shoulder 12 comprises a further horizontally arranged portion 16.

At a lower end of the holding element 2, the arms 10 are configured as guide pins 4 which in the conventional manner are able to be arranged in corresponding recesses in a backrest of a vehicle seat, not shown. In this case, the guide pins 4 are displaceably arranged in the backrest, so that a height-adjustment of the head restraint 1 is possible relative to the vehicle seat depending on the depth of penetration of the guide pins 4 in the backrest.

The head restraint structure 17 is pivotably coupled to the holding element 2 at its lower end. In this case, the head restraint 1 is configured to be pivotable about a shaft which is formed from the horizontally arranged portions 16 of the U-shaped holding element 2 of the head restraint 1.

Figure 3:
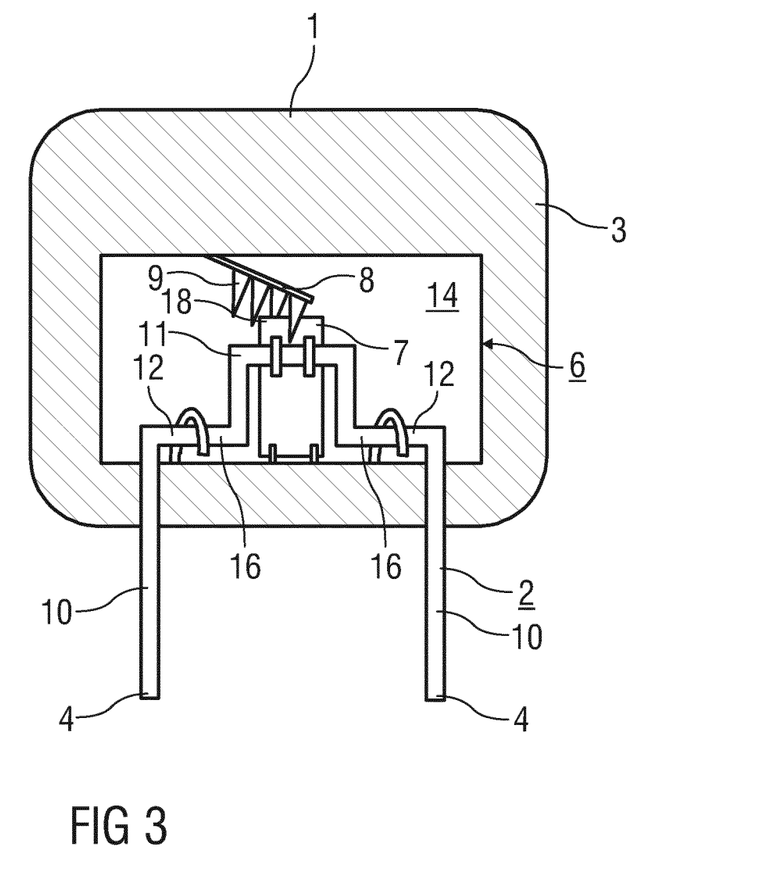
FIG. 3 shows schematically a front view of a head restraint.

FIG. 3 shows schematically a front view of the head restraint 1.

Figure 4:
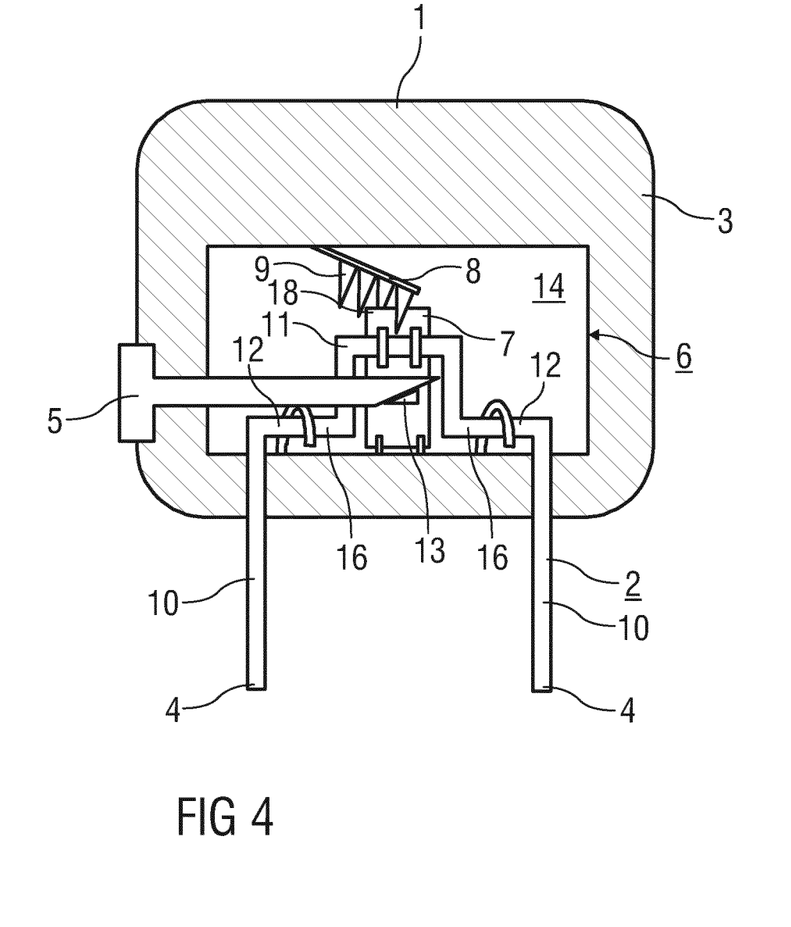
FIG. 4 shows schematically a front view of a head restraint with the actuating element.

FIG. 4 shows schematically a front view of the head restraint 1 with an actuating element 5.

The inclination-adjustment mechanism 6 comprises at least one latching plate 7, a toothed profile 8 and the actuating element 5. In this case, the latching plate 7 is arranged on the holding element 2 so as to be displaceable in the direction of the backrest.

The toothed profile 8 is arranged or shaped on the head restraint 1, in particular on the head restraint structure 17, so that when pivoting the head restraint 1 around the holding element 2, a relative movement is possible between the head restraint structure 17 and the latching plate 7, in particular between the latching plate 7 and the toothed profile 8.

A side edge of the latching plate 7, preferably an upper side edge 18, engages in a locked state of the head restraint 1 in the toothed profile 8, forming a positive and/or non-positive connection, whereby the head restraint 1 is locked, i.e. prevented from performing a pivoting movement.

The toothed profile 8 is preferably formed from a plurality of teeth, latching elements 9 or latching lugs arranged in succession in rows, wherein the number of teeth, latching elements 9 or latching lugs corresponds to the number of adjustment positions of the inclination-adjustment mechanism 6.

For releasing the positive and/or non-positive connection between the latching plate 7 and the toothed profile 8 and thus a possible inclination-adjustment of the head restraint 1 relative to the vehicle seat about the shaft, the latching plate 7 may be moved away from the toothed profile 8. In order to permit such a linear movement of the latching plate 7 in the direction of the backrest, for example an activating element 13 is shaped or integrally formed on the latching plate 7.

The activating element 13 in this case is configured to correspond at least partially with the actuating element 5.

The actuating element 5 and the activating element 13 cooperate mechanically, for example by means of two correspondingly shaped oblique portions. Actuating the actuating element 5 by applying a lateral compressive force results in a lateral movement of the actuating element 5 in the horizontal direction. The shaped oblique portions permit a deflection of the horizontal movement of the actuating element 5 into a linear vertical movement of the latching plate 7 in the direction of the backrest.

In an alternative variant, not shown, the toothed profile 8 may be moved in a linear manner away from the latching plate 7 or, for example, rotated or pivoted such that the positive and/or non-positive connection between the latching plate 7 and the toothed profile 8 is reversibly released.

In a further alternative variant, not shown, the positive and/or non-positive engagement between the latching plate 7 and the toothed profile 8 may be released by a lateral displacement movement of the latching plate 7 in the horizontal direction.

The inclination-adjustment mechanism 6 is arranged in the interior 14 of the head restraint 1. In this case, the interior 14 of the head restraint 1 is shaped by a corresponding shaping of the head restraint structure 17, such that a function of the inclination-adjustment mechanism 6 is permitted to its fullest extent.

The upper end of the holding element 2, the inclination-adjustment mechanism 6 and the head restraint structure 17 are preferably entirely, or virtually entirely, surrounded by the head restraint cushion 3. As a result, the inclination-adjustment mechanism 6 which preferably consists of hard materials, for example metal and/or plastics, is enclosed on all sides by the head restraint cushion 3 and the risk of injury to the seat occupant is reduced.

Figure 5:
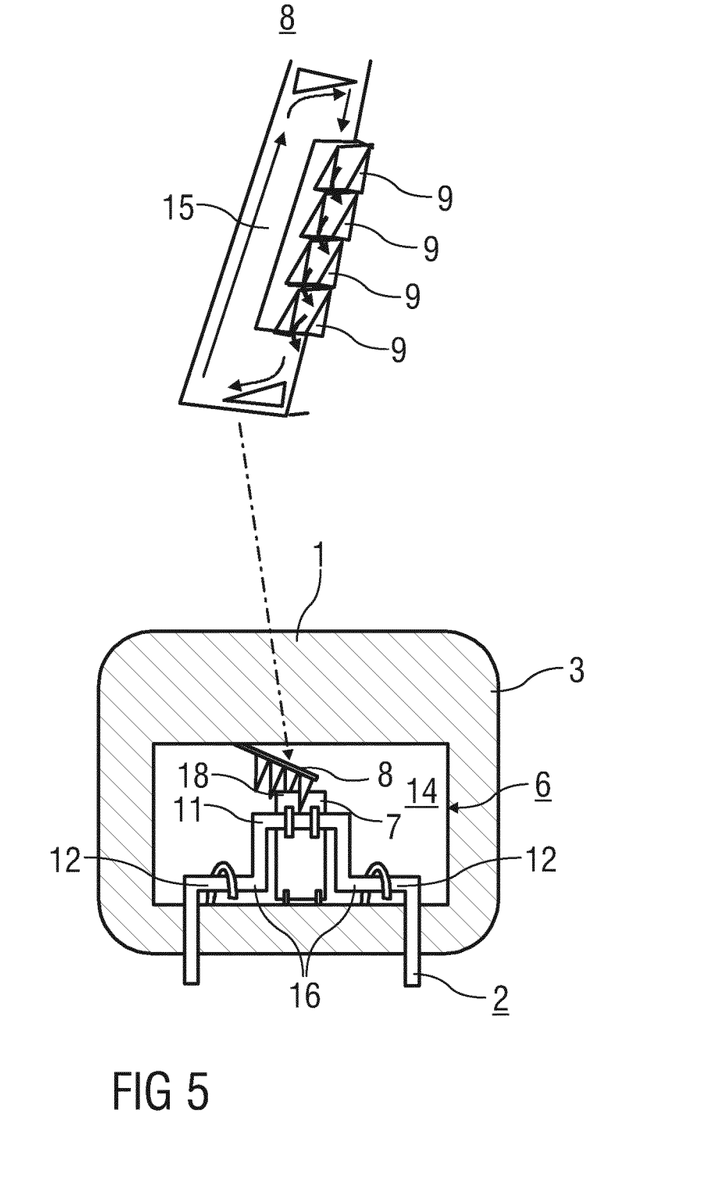
FIG. 5 shows schematically a detailed view of a toothed profile and FIG. 6 shows schematically a side view of an inclination-adjustment mechanism for a head restraint of a vehicle seat.

FIG. 5 shows schematically a detailed view of a toothed profile 8. In this variant, a sliding track 15 is formed on the toothed profile 8 to the side of the latching elements 9. The latching elements 9 in this case are configured in the manner of barbs and in this manner permit an inclination adjustment of the head restraint 1 in the direction of travel by simple compression. The opposing movement is prevented in normal operation by the barb-like latching elements 9, so that the head restraint 1 is locked by corresponding contact with the vehicle occupant.

At a lower end of the adjustment range, the positive and/or non-positive connection between the latching plate 7 and the latching element 9 may be released by a lateral displacement of the latching plate 7. The head restraint 1 may be pivoted in the direction of the upper end of the adjustment range, wherein the side edge of the latching plate 7 slides along the sliding track 15. After the inclination adjustment has been carried out, the latching plate 7 is displaced into its original position so that a positive and/or non-positive connection between the latching plate 7 and at least one latching element 9 is formed and the head restraint 2 is locked in this manner against pivoting movements.

Figure 6:
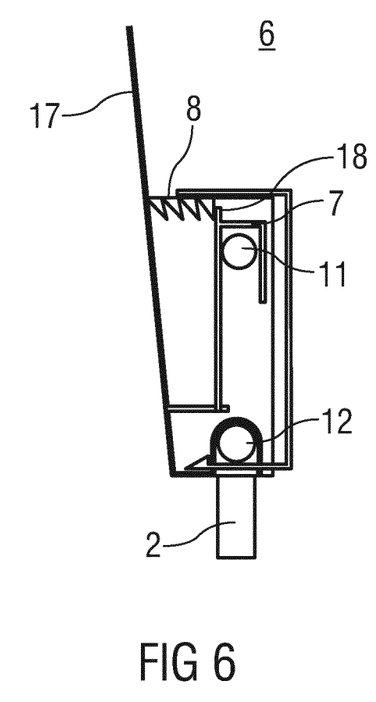

FIG. 6 shows schematically a side view of the inclination-adjustment mechanism 6 for a head restraint 1 of a vehicle seat.

LIST OF REFERENCE NUMERALS

1 Head restraint
2 Holding element

3 Head restraint cushion
4 Guide pin
5 Actuating element
6 Inclination-adjustment mechanism
7 Latching plate
8 Toothed profile
9 Latching element
10 Arm
11 Portion
12 Shoulder
13 Activating element
14 Interior
15 Sliding track
16 Horizontal portion
17 Head restraint structure
18 Side edge

The invention claimed is:

1. A head restraint that is adjustable with respect to at least one of height and inclination for a vehicle seat, comprising:
   at least one holding element;
   a head restraint cushion;
   a head restraint structure; and
   an inclination-adjustment mechanism which comprises at least one latching plate, a toothed profile and an actuating element,
   wherein the latching plate is arranged on the holding element,
   wherein the latching plate engages with the toothed profile such that the inclination adjustment mechanism is in a locked state,
   wherein the latching plate disengages from the toothed profile such that the inclination adjustment mechanism is in an unlocked state,
   wherein the toothed profile is arranged on the head restraint structure, and
   wherein the head restraint structure at its lower end is coupled pivotably to the holding element, and, upon pivoting the head restraint about the holding element in the non-locked state of the inclination-adjustment mechanism, the connection between the latching plate and the toothed profile is released such that a relative movement is brought about between the latching plate and the toothed profile,
   wherein the toothed profile is linearly movable with respect to the latching plate to release the connection between the toothed profile and the latching plate.

2. The head restraint as claimed in claim 1, wherein the linear movement of the toothed profile is away from the latching plate for the reversible release of the connection between the latching plate and the toothed profile.

3. The head restraint as claimed in claim 1, wherein the latching plate is displaceably arranged on the holding element.

4. The head restraint as claimed in claim 3, wherein the latching plate is arranged on the holding element so as to be displaceable in the horizontal direction.

5. The head restraint as claimed in claim 3, wherein the actuating element and an activating element of the latching plate cooperate mechanically, wherein the activating element is configured to correspond at least partially with the actuating element.

6. The head restraint as claimed in claim 5, wherein lateral movement of the actuating element in a horizontal direction linearly moves the latching plate in a vertical direction.

7. The head restraint as claimed in claim 3, wherein the latching plate is linearly movable relative to the holding element.

8. The head restraint as claimed in claim 4, wherein the latching plate is laterally displaceable along an axis that is parallel to a pivot axis of the head restraint structure.

9. The head restraint as claimed in claim 1, wherein the holding element is of substantially U-shaped configuration and comprises two arms and a horizontally arranged portion, wherein one respective shoulder is arranged in the respective coupling region between the arms and the horizontally arranged portion, said shoulder in each case comprising a further horizontally arranged portion.

10. The head restraint as claimed in claim 9, wherein at a lower end of the holding element the arms are configured as guide pins which are displaceably arranged at least partially in corresponding recesses in a backrest of the vehicle seat.

11. The head restraint as claimed in claim 1, wherein the head restraint is configured to be pivotable about a shaft which is formed from the horizontally arranged portions of the U-shaped holding element.

12. The head restraint as claimed in claim 1, wherein the toothed profile is formed from a predeterminable number of teeth, latching elements or latching lugs arranged in succession in rows.

13. A head restraint that is adjustable with respect to at least one of height and inclination for a vehicle seat, comprising:
   at least one holding element;
   a head restraint cushion;
   a head restraint structure; and
   an inclination-adjustment mechanism which comprises at least one latching plate and a toothed profile,
   wherein the latching plate engages with the toothed profile such that the inclination adjustment mechanism is in a locked state,
   wherein the latching plate disengages from the toothed profile such that the inclination adjustment mechanism is in an unlocked state,
   wherein the latching plate is arranged on the holding element, and
   wherein the toothed profile is shaped in the manner of a barb and such that a relative movement is permitted between the latching plate and the toothed profile in the direction of travel in the locked state of the inclination-adjustment mechanism, and
   wherein, in a non-locked state of the inclination-adjustment mechanism, a relative movement between the latching plate and the toothed profile counter to the direction of travel is permitted,
   wherein the toothed profile is linearly movable with respect to the latching plate to release a connection between the toothed profile and the latching plate.

14. The head restraint as claimed in claim 1, wherein the connection between the latching plate and the toothed profile is a positive connection.

15. The head restraint as claimed in claim 1, wherein the connection between the latching plate and the toothed profile is a non-positive connection.

* * * * *